United States Patent
Garcia et al.

(10) Patent No.: US 7,699,218 B2
(45) Date of Patent: Apr. 20, 2010

(54) METHOD OF CONVERTING VIRTUAL CASH TO CASH AND DEDUCTING FROM A MOBILE PHONE CASH ACCOUNT

(75) Inventors: Rodell Garcia, Mandaluyong (PH); Raul Macatangay, Mandaluyong (PH); Mickey Cayetano, Mandaluyong (PH); Grace Reyes, Mandaluyong (PH); Jewel Dimanno, Mandaluyong (PH); Marlowe Pongol, Mandaluyong (PH); Sheila Jimenez, Mandaluyong (PH); Melenita Quito, Mandaluyong (PH); Jenny Villanueva, Mandaluyong (PH); Justine Camacho, Mandaluyong (PH); Glenn Mendoza, Mandaluyong (PH); Kaytee Reyes, Mandaluyong (PH); Shydee Buizon-Tiambeng, Mandaluyong (PH); Jessica A. Reyes, Mandaluyong (PH); Joanne Avendano, Mandaluyong (PH); Verna Quinton, London (GB); Alain Bustamante, Mandaluyong (PH); Louie Domingo, Mandaluyong (PH); Fernando P. Teodoro, Mandaluyong (PH); Richard Matotek, Mandaluyong (PH); Andrew Barnham, Ballarat (AU); Justin Ho, Singapore (SG)

(73) Assignees: G-Xchange, Inc. (PH); Utiba Pty, Ltd. (AU)

( * ) Notice: Subject to any disclaimer, the term of this patent is extended or adjusted under 35 U.S.C. 154(b) by 17 days.

(21) Appl. No.: 12/069,462

(22) Filed: Feb. 11, 2008

(65) Prior Publication Data
US 2009/0026257 A1 Jan. 29, 2009

Related U.S. Application Data

(63) Continuation of application No. PCT/PH2006/000006, filed on May 23, 2006.

(51) Int. Cl.
G07F 19/00 (2006.01)

(52) U.S. Cl. .................................. 235/379; 235/375
(58) Field of Classification Search ................ 234/379, 234/375; 902/2, 3, 4, 5, 10
See application file for complete search history.

(56) References Cited

U.S. PATENT DOCUMENTS 7,100,821 B2 * 9/2006 Rasti ........................ 235/380

FOREIGN PATENT DOCUMENTS

| EP | 1280115 | 1/2003 |
|---|---|---|
| JP | 2001-357164 | 12/2001 |
| WO | WO 01-97118 | 12/2001 |

OTHER PUBLICATIONS

International Preliminary Report on Patentability, mailed Feb. 26, 2008.
Written Opinion of the International Searching Authority, mailed Oct. 3, 2006.
International Search Report, mailed Oct. 3, 2006.

* cited by examiner

Primary Examiner—Karl D. Frech
(74) Attorney, Agent, or Firm—Hershkovitz & Associates, LLC; Abraham Hershkovitz

(57) ABSTRACT

The method of converting cash into virtual cash and loaded into a mobile phone cash account using telco's cash product services comprising the steps of: —customer going to outlet to convert cash into virtual cash using telco's product services; —customer filling up forms, showing identification; —frontliner of outlet verifying customer's identification; —frontliner accessing the device and keying command containing—customer's information, reference number of registration form, —customer's or $3^{rd}$ party-recipient's mobile phone number and amount of cash to be converted to virtual cash and sends this to telco; —frontliner collecting cash to be converted to virtual cash and the service fee and issues receipt to the customer; —customer receiving SMs acknowledgment from telco that the cash has been converted to virtual cash and loaded in the recipient's mobile phone cash account; —frontliner's device receiving a message from telco (with format matching the device) of acknowledgement with confirmation number.

1 Claim, 3 Drawing Sheets

METHOD OF CONVERTING VIRTUAL CASH TO CASH AND DEDUCTING FROM A MOBILE PHONE CASH ACCOUNT

RELATED APPLICATIONS

This is a continuation patent application that claims priority to PCT patent application number PCT/PH2006/000006, filed on May 23, 2006, which claims the benefit of Philippines application no. 1-2005-000419, filed on Aug. 22, 2005, the entirety of which are herein incorporated by reference.

FIELD OF INVENTION

This invention relates in general to mobile phones but more particularly a method of receiving and transmitting data to effect individual financial transactions.

Financial transactions are commonly conducted using a wide variety of credit and debit cards. the transactions may be on-line or off-line retail purchase to withdraw cash or make financial transfers using automated teller machines or self service terminals.

With the advent of mobile phones, the following transactions, namely: (a) balance inquiry, (b) airtime load transfers, (c) finds transfer from one account to another account where both accounts are maintained by one bank, and (d) bills payments where finds are transferred from one account to another account where both accounts are maintained by one bank, are completed by sending Short Messaging Service (SMS) commands using mobile phones.

It is the primary aim of the present invention to provide a method of using the mobile phones for financial transfers and for purchase of goods or services using SMS as the lowest common denominator among all mobile phone users.

Another object is to provide a method of converting virtual cash loaded into a mobile phone cash account to cash and receiving said cash from a telephone company's (telco) outlet or from a $3^{rd}$ party (outlet) through a range of devices including mobile phone, web portal, point-of-sale terminal (device) using telco's cash product services.

The cash received can be used to purchase goods or services with much more ease than going to a bank and withdrawing money.

Still an object is to provide a novel method using the mobile phone in converting virtual cash to cash and purchasing goods or services wherein transaction data is simultaneously transferred and recorded to and on the user's mobile phone and the outlet's device.

Figure 1:
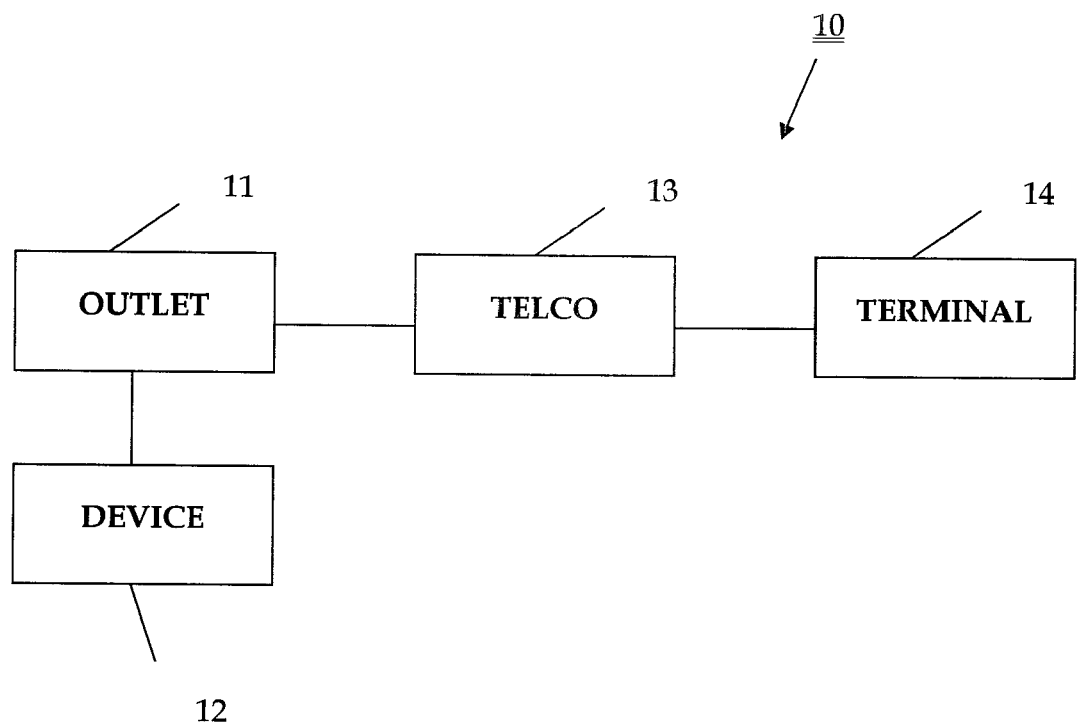
Figure 2:
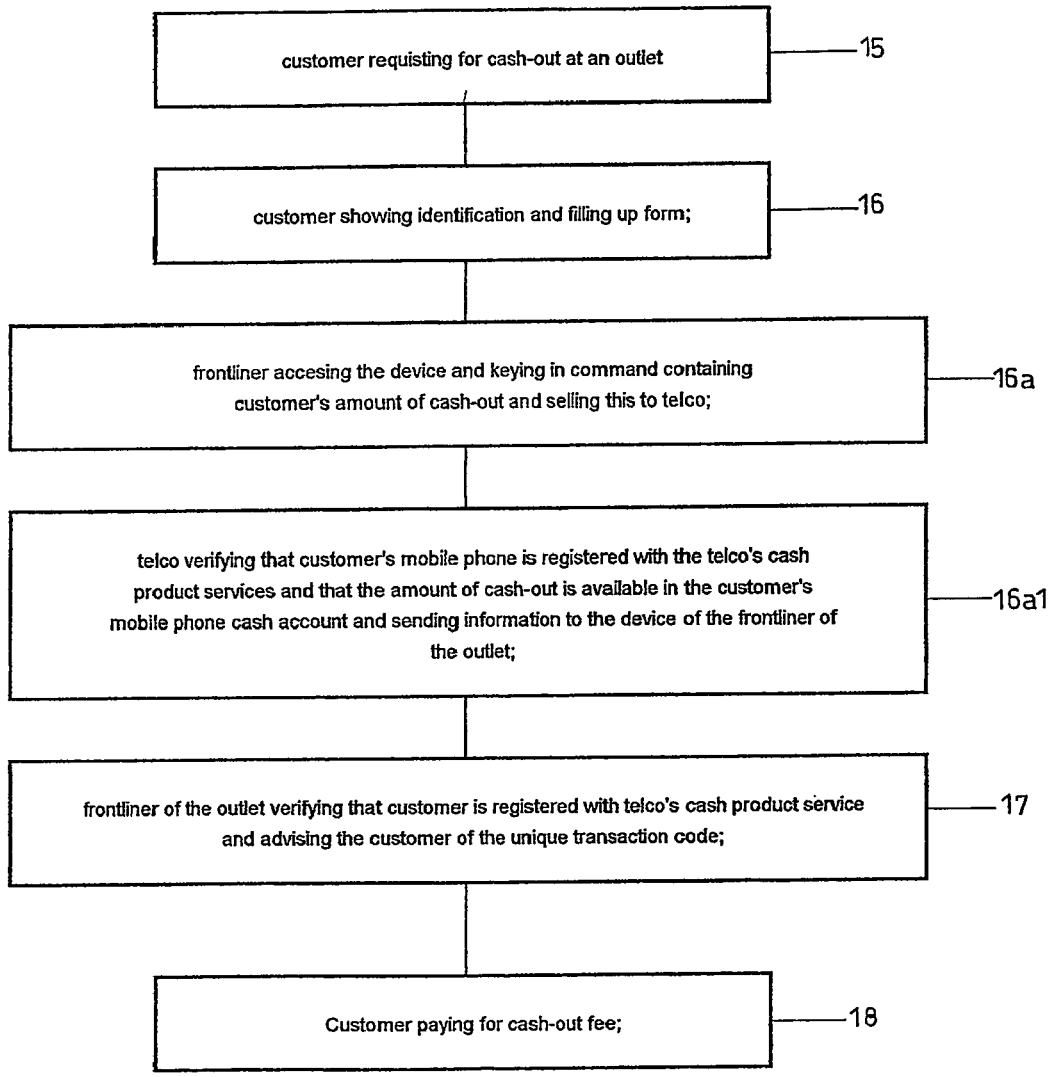
Figure 2:
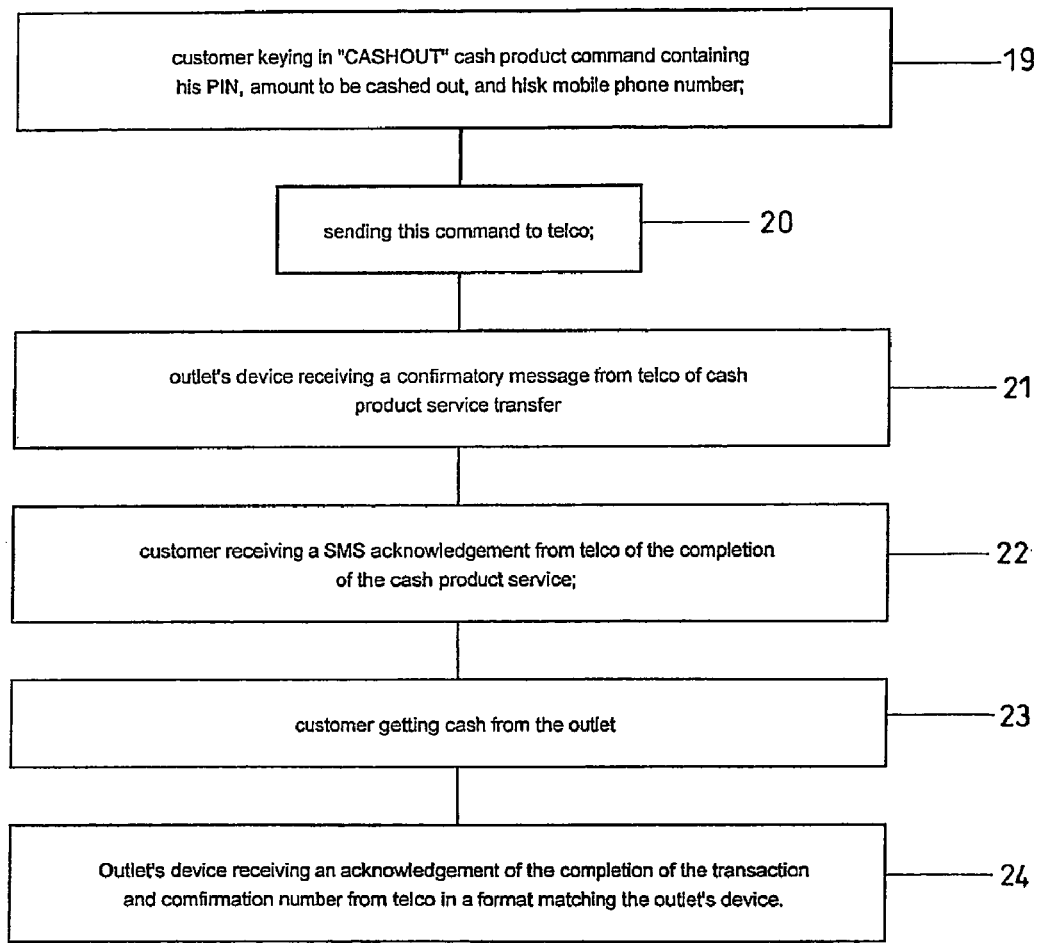

These and other objects and advantages of the present invention will become apparent upon reading the following detailed description taken in conjunction with the appended drawings, wherein:

FIG. 1 is a block diagram of the elements involved in carrying out the method; and FIG. 2 is a flow chart of the method.

Referring now to several views of the drawings wherein like reference numerals designate same parts throughout, the method of receiving cash from an outlet through a customer's mobile phone is shown and involves a customer 10 with his mobile phone_cash account, an outlet 11 with its device 12 and a teleco 13 with its terminal 14 which are all united by software.

The customer 10 requests (15) for cash-out at an outlet showing (16) his mobile phone and he fills up a form containing his name and the amount to be cashed out.

Frontliner accesses the device and keys in command (16*a*) containing customer's amount of cash-out and sends this to telco.

The telco verifies (16*a*) that the customer is registered with the teleco's 13 cash product services and that the amount of cash-out is available in the customer's mobile phone cash account.

The telco then sends out the verification to the outlet's device.

The frontliner of the outlet receives the verification (17) that the customer is registered with the teleco's 13 cash product services and advices the customer of the unique transaction code. The customer pays (18) the cash-out fee.

Then, the customer keys in (19) a "CASHOUT" command containing his personal identification number (PIN), amount to be cashed-out, and transaction key on his mobile phone and sending (20) this to telco.

The telco deducts the customer's mobile phone cash account with the amount of cash-out and credits the same amount to the outlet (20*a*).

The outlet's device receives a confirmatory (21) message from telco.

The customer then receives (22) SMS acknowledgment from telco of the completed cash product service transfer.

The customer gets cash (23) from the outlet.

The outlet receives (24) an acknowledgment with confirmation from telco in a format that corresponds to the outlet's device.

With thus, a customer need not go to a bank to withdraw money. He just uses his mobile phone to get the cash.

We claim:

1. The method of receiving cash from an outlet through a mobile phone, the method comprising:
    requesting cash-out at an outlet by a customer;
    showing identification and filling out a form by the customer;
    a frontliner, accessing a device, keying in a command including the customer's amount of cash-out, and sending the command to a telco;
    by the telco, verifying that the customer's mobile phone is registered with the telco's cash product service, and that the amount of cash-out is available in the customer's mobile phone cash account, and sending information to the device of the frontliner of the outlet;
    by the frontliner of the outlet, verifying that the customer is registered with the telco's cash product service, and advising the customer of a unique transaction code;
    by the customer, paying for a cash-out fee;
    by the customer, keying in "CASHOUT" cash product command containing a PIN, the amount of cash-out, and the customer's mobile phone number;
    sending the CASHOUT cash product command to the telco;
    by the outlet's device, receiving a confirmatory message from the telco of a cash product service transfer;
    by the customer, receiving a SMS acknowledgment from the telco of completion of the cash product service;
    by the customer, getting the amount of cash-out from the outlet;
    by the outlet's device, receiving an acknowledgment of completion of a transaction and a confirmation number from the telco in a format matching the outlet's device.

* * * * *